UNITED STATES PATENT OFFICE.

ELIAS REIST, OF WILLIAMSVILLE, NEW YORK.

METHOD OF CLEANING WHEAT.

SPECIFICATION forming part of Letters Patent No. 340,155, dated April 20, 1886.

Application filed October 22, 1885. Serial No. 180,666. (No specimens.)

*To all whom it may concern:*

Be it known that I, ELIAS REIST, a citizen of the United States, residing at Williamsville, in the county of Erie and State of New York, have invented certain new and useful Improvements in Methods of Cleaning Wheat; and I do declare the following to be a full, clear, and exact description of the invention, such as will enable others skilled in the art to which it appertains to make and use the same.

This process relates to cleaning wheat, in connection with any machine for cleaning and scouring grains; but my invention does not relate to such machine, but only to the use of bran put in with the wheat before or during the cleaning process, all as hereinafter fully set forth.

By the usual course of cleaning wheat by machines alone, the grains of wheat are not thoroughly scoured, as the creases in the wheat retain more or less of dirt, smut, &c., that the brushes, screens, &c., do not reach.

To insure a thorough cleaning, and thereby greatly improve the quality of flour, I take the coarse finished bran that comes from the wheat itself from the bran-duster and run it in with the grains into any wheat-cleaner. The bran aids greatly in cleansing out the crease-dirt in the grains, and works it over and polishes it much better than by any machine without its use. Especially does it remove the gum on the grains which brushes and scourers do not usually get at.

The coarse bran that the mill makes at the time the wheat is being ground is sufficient for the cleaning. This will be of course according to the quantity of wheat being run through the scourer—say about six to twelve pounds of bran to a bushel of wheat, only the coarse bran being used. The amount of bran used is, however, not considered important.

It is well known that with the brush-machines after the cleaning the wheat is found to contain more or less dirt, and that the brushes are as likely as not to brush dirt into the grain-creases. By my use of loose bran the dirt adheres to the bran rather than to the wheat, and, in working the berries over, is continually wiping and polishing them.

I am aware that sand was formerly used for cleaning; but it was found objectionable, as it is too sharp, and part of it stays in the wheat, making it gritty. Besides, it cuts and wears into the grain; but with bran this is not so. Before putting the bran in, the wheat may, if desired, be run through any ordinary cleaner. Then the bran may be put in with the wheat and operated on sufficient to rub off every particle, even the crease-dirt. The impurities loosened during this operation will adhere to the bran (more or less) and pass off with the bran by the air-current and usual sifting devices. After the cleaning the bran is easily separated from the wheat by screens, airblast, or any other method. This I do not claim.

What I claim is—

The herein-described method of cleaning wheat, which consists in mixing bran and wheat and then subjecting the same to the action of suitable scouring devices, substantially as set forth.

In testimony whereof I affix my signature in presence of two witnesses.

ELIAS REIST.

Witnesses:
J. R. DRAKE,
T. H. PARSONS.